(12) United States Patent
Henley, III et al.

(10) Patent No.: US 12,480,587 B2
(45) Date of Patent: Nov. 25, 2025

(54) HYDRAULIC CONTROL UNIT VALVE PORTING, ROUTING, CHECKBALL, AND ORIFICE INTEGRATION WITH ADDITIVE MANUFACTURING

(71) Applicants: John N Henley, III, Auburn Hills, MI (US); Richard G Whalen, Macomb, MI (US); Zhe Xie, Rochester, MI (US); Mark A Levine, White Lake, MI (US)

(72) Inventors: John N Henley, III, Auburn Hills, MI (US); Richard G Whalen, Macomb, MI (US); Zhe Xie, Rochester, MI (US); Mark A Levine, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 1372 days.

(21) Appl. No.: 17/131,847

(22) Filed: Dec. 23, 2020

(65) Prior Publication Data

US 2022/0196170 A1 Jun. 23, 2022

(51) Int. Cl.
*F16K 15/04* (2006.01)
*B33Y 80/00* (2015.01)
*F16H 61/00* (2006.01)

(52) U.S. Cl.
CPC ............ *F16K 15/04* (2013.01); *B33Y 80/00* (2014.12); *F16H 61/0009* (2013.01)

(58) Field of Classification Search
CPC ....... F16H 2061/0046; F16H 2061/308; F16H 61/0009; F16H 61/0021; B22F 5/10; F15B 13/081; F15B 13/0817; F15B 13/0807; F15B 13/0814; F15B 13/0892; F15B 13/0896; B29L 2031/60; B29L 2031/601; B33Y 80/00; F16K 31/0613; F16K 27/003; F16K 27/0209; Y10T 137/86485;

(Continued)

(56) References Cited

U.S. PATENT DOCUMENTS 749,810 A * 1/1904 Truman .................. F16K 15/04
137/519.5
1,700,234 A * 1/1929 Mccrosky ............... F16K 15/04
137/533.11

(Continued)

FOREIGN PATENT DOCUMENTS

CH 226516 A * 4/1943
JP 2017053421 A 3/2017

(Continued)

*Primary Examiner* — Marina A Tietjen
(74) *Attorney, Agent, or Firm* — Jeremy J. Klobucar

(57) ABSTRACT

An additive manufactured (AM) hydraulic control assembly includes a first AM hydraulic passage having a first tubular wall defining a first fluid passage, a second AM hydraulic passage integrally formed with the first AM hydraulic passage and having a second tubular wall defining a second fluid passage, and an AM wall integrally formed with the first and second AM hydraulic passages and fluidly separating the first and second fluid passages. At least one of (i) a hydraulic control orifice is formed in the AM wall and configured to regulate fluid flow and pressure between the first and second fluid passages, and (ii) a ball seat is formed in the AM wall and a check ball is disposed in one of the first and second fluid passages and configured to selectively seal against the ball seat to facilitate preventing fluid flow therethrough.

10 Claims, 11 Drawing Sheets

(58) Field of Classification Search
CPC .. Y10T 137/794; Y10T 137/7927–7928; F16L 55/02
See application file for complete search history.

(56) References Cited

U.S. PATENT DOCUMENTS

| | | | | | |
|---|---|---|---|---|---|
| 1,892,649 | A | * | 12/1932 | Buenger | ............... F16K 15/04 138/37 |
| 2,841,174 | A | * | 7/1958 | Frye | ................. F16K 17/0406 137/539.5 |
| 4,155,374 | A | * | 5/1979 | Diehl | ................... F16K 15/04 137/533.15 |
| 4,601,305 | A | * | 7/1986 | Nordskog | ............. F16K 15/04 137/528 |
| 4,611,374 | A | * | 9/1986 | Schnelle | ............. B23P 15/001 29/445 |
| 4,611,786 | A | * | 9/1986 | Jorgensen | .......... F24D 19/0009 138/44 |
| 2017/0159868 | A1 | * | 6/2017 | Fisher | ................ F16L 55/027 |

FOREIGN PATENT DOCUMENTS

| | | | |
|---|---|---|---|
| RU | 2725909 C1 | * | 7/2020 |
| WO | 2018220938 A1 | | 12/2018 |

\* cited by examiner

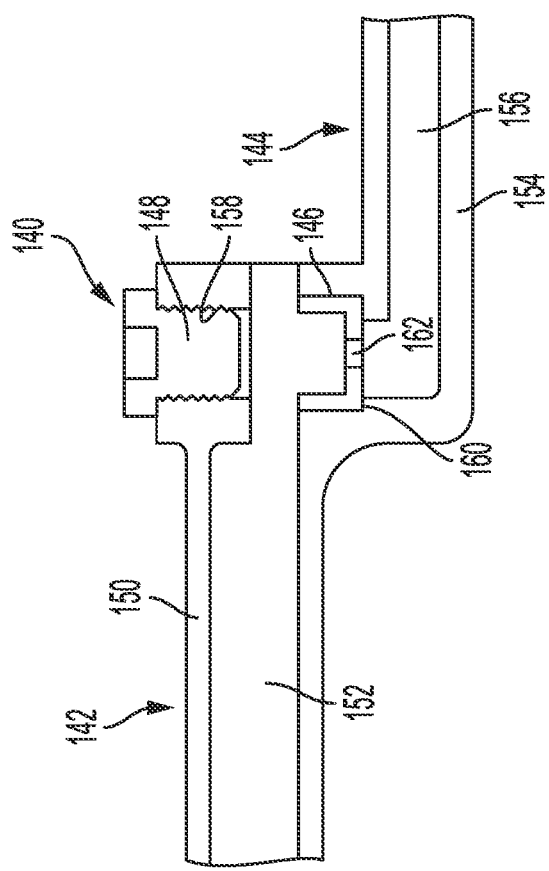
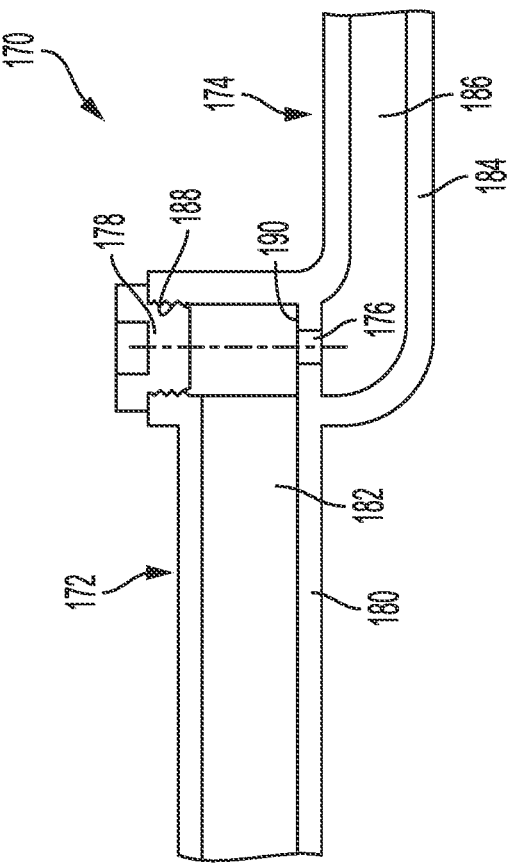
FIG. 5
FIG. 6

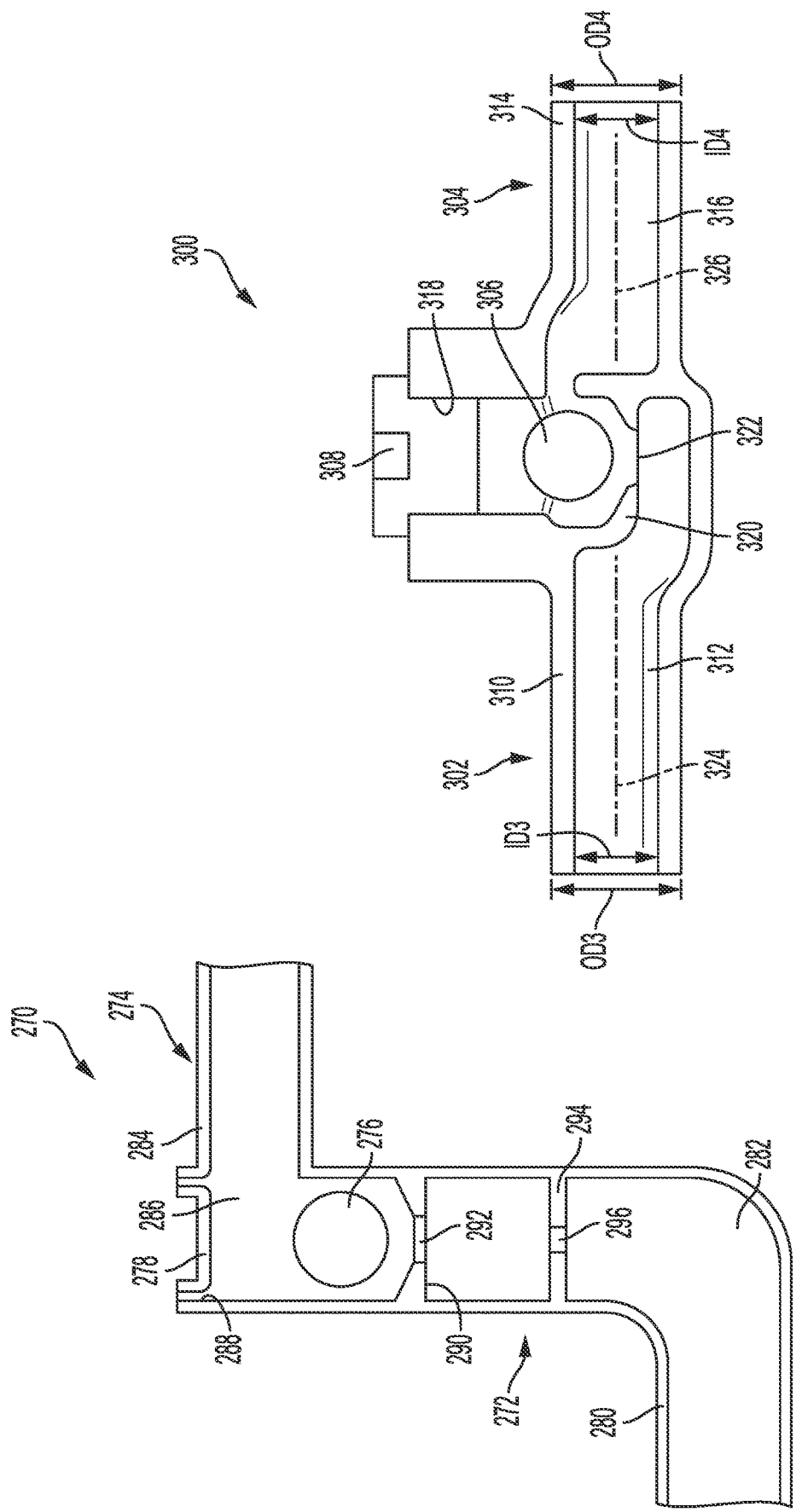

HYDRAULIC CONTROL UNIT VALVE PORTING, ROUTING, CHECKBALL, AND ORIFICE INTEGRATION WITH ADDITIVE MANUFACTURING

FIELD

The present application relates generally to transmission hydraulic control units and, more particularly, to a transmission hydraulic control unit with additive manufactured valve porting, routing, check balls, and orifices.

BACKGROUND

Modern vehicle transmissions typically include a hydraulic control unit to control hydraulic pressure and direct hydraulic fluid within hydraulic passages to control one or more components of the transmission. Some typical configurations include multiple layers of cast bodies divided by separator plates, which are all clamped together with several fasteners. This can potentially lead to leakage at the interface between the valve body and separator plates. Due to the nature of the casting process by which these parts are made, the minimum size of the hydraulic passages is typically in excess of the requirement, thereby potentially adding unnecessary mass to the system. Thus, while such conventional systems work well for their intended purpose, there remains a desire for improvement in the relevant art.

SUMMARY

According to one example aspect of the invention, an additive manufactured (AM) hydraulic control assembly is provided. In one example configuration, the assembly includes a first AM hydraulic passage having a first tubular wall defining a first fluid passage, a second AM hydraulic passage integrally formed with the first AM hydraulic passage and having a second tubular wall defining a second fluid passage, and an AM wall integrally formed with the first and second AM hydraulic passages and fluidly separating the first and second fluid passages. At least one of (i) a hydraulic control orifice is formed in the AM wall and configured to regulate fluid flow and pressure between the first and second fluid passages, and (ii) a ball seat is formed in the AM wall and a check ball is disposed in one of the first and second fluid passages and configured to selectively seal against the ball seat to facilitate preventing fluid flow therethrough.

In addition to the foregoing, the described assembly may include one or more of the following features: only including (i) the hydraulic control orifice; only including (ii) the ball seat and check ball; both (i) the hydraulic control orifice and (ii) the ball seat and check ball, wherein the hydraulic control orifice is formed in a first wall of the AM wall, and the ball seat is formed in a second wall of the AM wall; wherein the first AM hydraulic passage extends along a first axis and the second AM hydraulic passage extends along a second axis; wherein the first axis is offset from the second axis; wherein the first axis and the second axis are the same axis; wherein the hydraulic control orifice extends along a third axis; wherein the first, second, and third axes are the same axis; and wherein the third axis is substantially perpendicular to the first and second axes.

In addition to the foregoing, the described assembly may include one or more of the following features: wherein the first AM hydraulic passage is formed with an external opening configured to enable access to the hydraulic control orifice, and including a plug configured to selectively seal the hydraulic control orifice; wherein hydraulic control orifice is formed in an orifice insert configured to be inserted through the external opening, and wherein the wall includes a seat configured to receive the orifice insert; and wherein a portion of the first fluid passage and a portion of the second fluid passage overlap where the AM wall separates the first and second fluid passages.

In addition to the foregoing, the described assembly may include one or more of the following features: a chamber fluidly coupled between the first and second fluid passages and configured to receive the check ball, and a bypass passage fluidly coupled to the chamber to provide a dual path check ball arrangement that facilitates providing fluid forces on opposite sides of the check ball during seating; wherein the AM wall includes a first AM wall defining the ball seat, and a second AM wall defining a ball stop, wherein a ball chamber is formed between the first and second AM walls and configured to receive check ball; and wherein the check ball is an AM check ball formed during the formation of the first and second AM hydraulic passages and the first and second AM walls.

According to another example aspect of the invention, an additive manufactured (AM) valve body for a hydraulic control unit of a vehicle transmission is provided. In one example configuration, the AM valve body includes an AM hydraulic control assembly having a first AM hydraulic passage having a first tubular wall defining a first fluid passage, a second AM hydraulic passage integrally formed with the first AM hydraulic passage and having a second tubular wall defining a second fluid passage, and an AM wall integrally formed with the first and second AM hydraulic passages and fluidly separating the first and second fluid passages. At least one of (i) a hydraulic control orifice is formed in the wall and configured to regulate fluid flow and pressure between the first and second fluid passages, and (ii) a ball seat is formed in the wall and a check ball is disposed in one of the first and second fluid passages and configured to selectively seal against the ball seat to facilitate preventing fluid flow therethrough.

In addition to the foregoing, the described AM valve body may include one or more of the following features: an AM hydraulic passage having a third tubular wall defining a third fluid passage, and at least one AM valve housing having a fourth tubular wall defining a bore configured to receive a hydraulic valve, wherein the AM hydraulic passage and the at least one AM valve housing are integrally formed and share a common wall; an AM valve port assembly including a plurality of AM hydraulic passages, and an AM valve port integrally formed with and fluidly coupled to the plurality of AM hydraulic passages, the AM valve port configured to receive a valve stem with a plurality seals configured to selectively hydraulically seal one or more hydraulic passages of the plurality of AM hydraulic passages; and wherein the AM valve port includes an outer wall forming with an annulus about an intersection of the AM valve port and one hydraulic passage of the plurality of hydraulic passages, and wherein at least one notch is formed in the outer wall to facilitate even pressure distribution to enable the gradual opening of the plurality of seals as they seal/unseal from their respective hydraulic passage.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF THE DRAWINGS

FIG. 5 is a cross-sectional view of an example AM hydraulic control orifice assembly that may be formed in the AM valve body shown in FIG. 1, in accordance with the principles of the present application;

FIG. 6 is a cross-sectional view of another example AM hydraulic control orifice assembly that may be formed in the AM valve body shown in FIG. 1, in accordance with the principles of the present application;

FIG. 12 is a cross-sectional view of an example AM hydraulic control orifice and check ball assembly that may be formed in the AM valve body shown in FIG. 1, in accordance with the principles of the present application;

FIG. 13 is a cross-sectional view of another example AM hydraulic control check ball assembly that may be formed in the AM valve body shown in FIG. 1, in accordance with the principles of the present application;

DESCRIPTION

Figure 1:
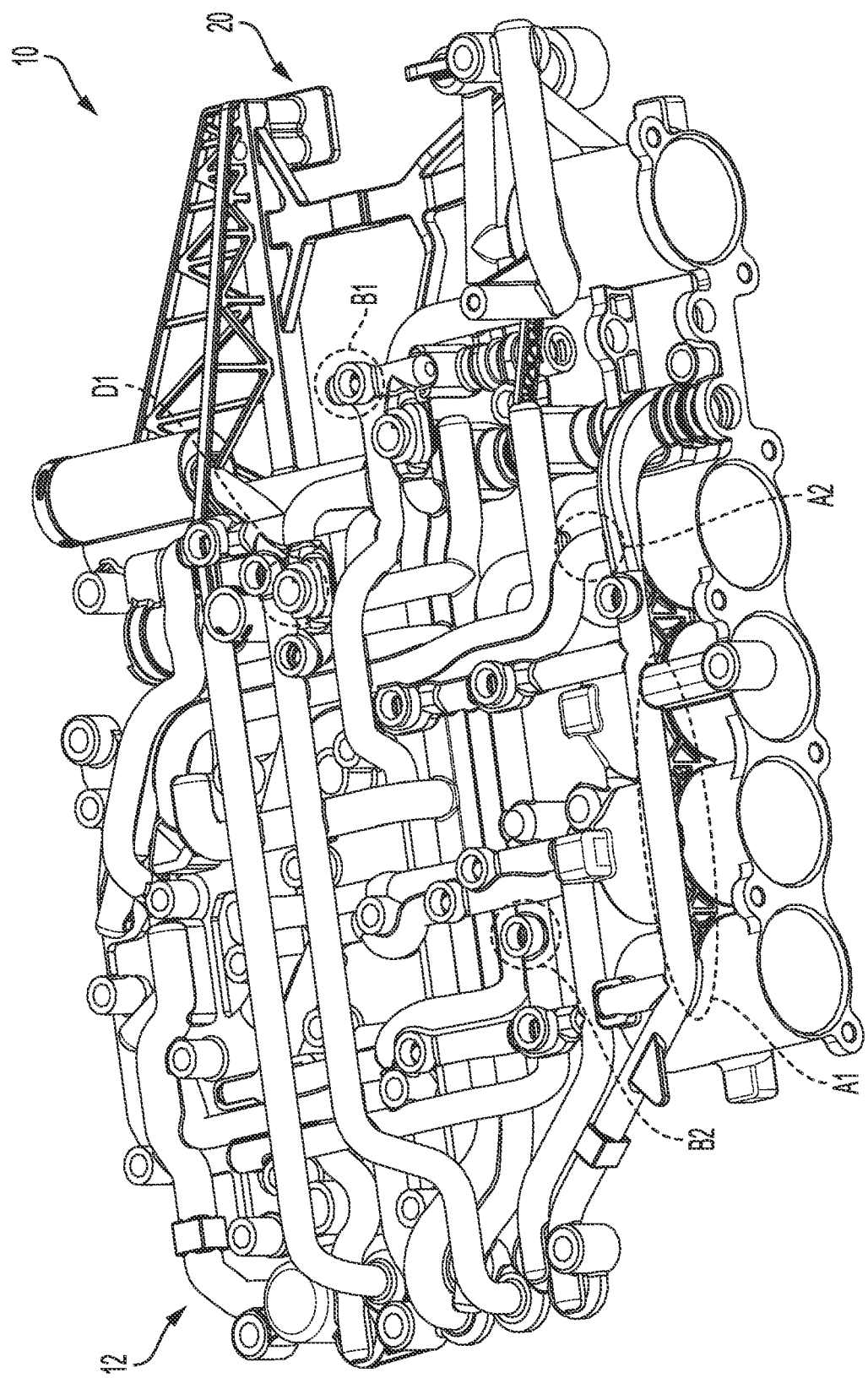
FIG. 1 is a bottom perspective view of an example additive manufactured (AM) valve body for a vehicle transmission, in accordance with the principles of the present application.

The present application is directed to a transmission hydraulic control unit having one or more additive manufactured (AM) features such as, for example, hydraulic control valve bores, hydraulic control valve ports, hydraulic control orifices, check balls, check valves, and hydraulic passages. The hydraulic control unit with additive manufactured features is configured to direct hydraulic fluid to and from valve to case interface, or from valve to valve, or from valve to and from pump within the AM hydraulic passages. The hydraulic control unit also controls hydraulic pressure and/or flow by restricting passages with AM hydraulic control orifices and, when combined with a hydraulic control valve bore, hydraulic control valve, and valve spring, the unit regulates hydraulic pressure of downstream circuits. Using a combination of a check ball/valve, spring, check ball pocket, and check ball seat, the pressurized flow can be stopped in one direction and allowed to flow in the opposite.

In one example, AM hydraulic passages are routed directly from valve to case interface, directly from valve to valve, or directly from valve to pump. Passages are formed by AM tubes that connect the various features in a direct path. The passages are formed such that they share a wall with adjoining passages and/or hydraulic valve bores to reduce material usage and increase part stiffness. The AM hydraulic passages may be parallel or intersecting and share a common wall.

In another example, the hydraulic control unit controls hydraulic pressure and/or flow by restricting the AM hydraulic passages with a hydraulic control orifice. Upstream and downstream AM hydraulic passages are formed to overlap at the orifice such that the outside diameter of the AM hydraulic passage remains the same. An orifice is then formed or drilled to connect the two AM hydraulic passages. When the orifice is drilled, a boss with an opening is formed above the location of the orifice and is subsequently plugged to seal the AM hydraulic passage. Alternatively, the orifice is formed directly in the AM hydraulic passage with no external means of reaching the orifice.

In yet another example, the hydraulic control unit utilizes an AM hydraulic control valve bore, hydraulic control valve, and valve biasing mechanism (e.g., spring) to regulate hydraulic pressure of downstream circuits. An AM hydraulic port is formed to encompass the valve in an annular manner, and the walls of the port are offset from the bore by some distance to promote an evenly distributed flow to the valve to eliminate unbalanced flow forces. The adjoining AM hydraulic passage is formed such that the transition to the AM hydraulic port is gradual, which facilitates reducing the pressure drop between the port and the passage.

Additionally, a notch or series of notches can be formed in the wall of the AM regulating valve port to gradually connect two AM ports as the valve translates and thus facilitates decreasing pressure oscillations. The notches can be formed such that any number of notches occur in any orientation around the AM valve opening, which facilitates balancing the flow forces on the valve to prevent wear. The shape of the notches can also be optimized to obtain specific flow characteristics for each application.

In another example, the hydraulic control unit utilizes combinations of check balls, check ball pockets, and check ball seats to facilitate preventing pressurized fluid flow in one direction while allowing fluid flow in another direction. One AM hydraulic passage upstream of a check ball is overlapped with a second AM hydraulic passage downstream of the check ball. The check ball seat is formed into the overlapping portion of the AM passages, the check ball is inserted into the pocket, and the pocket is capped to retain the check ball. A wall is formed to facilitate preventing the check ball from moving into the downstream passage, but fluid is still allowed to flow around the check ball.

Alternatively, the AM hydraulic passage upstream of the check ball is overlapped with the AM hydraulic passage downstream of the check ball, and the check ball seat is formed into the overlapping portion of the AM passage. The check ball is inserted into the pocket and the pocket is capped to retain the check ball. A wall is formed to facilitate preventing the check ball from moving into the downstream AM passage but fluid is still allowed to flow around the check ball. An additional AM passage is formed such that fluid can be directed around to the opposite side of the check ball pocket. When the flow is reversed to check the ball, the additional flow facilitates balanced flow forces to improve the response of the check ball. In another configuration, a check ball seat is formed directly into the AM hydraulic passage, and an AM check ball is also formed directly into the AM passage. The non-checking side of the AM passage is formed to facilitate preventing the check ball from moving out of the check ball pocket and into the downstream passage while allowing fluid to flow around the check ball.

Accordingly, at least a portion of the hydraulic control unit is additive manufactured with integrated valve porting, routing, check balls, and/or orifices to reduce the number of parts and overall system mass compared to conventionally cast and fastened systems. Advantageously, the AM hydraulic passages are shortened and routed directly from valve to case interface, valve to valve, and from valve to pump compared to conventional systems to thereby facilitate decreasing pressure drop in the circuit. The AM hydraulic passages can be optimized to the minimum size required to meet requirements, thereby decreasing mass and material cost. Draft is no longer required and the port geometry can be optimized for flow performance and elimination of unbalanced load on valves from the flow forces. Notches on the hydraulic ports can be made in any direction and can be optimized for valve stability, flow performance, and elimination of unbalanced load on valves from flow forces. Additionally, leakage is reduced or prevented with the reduction of parts and elimination of joints compared to conventional systems. Orifices can be integrated in-line with the AM passage to facilitate reducing passage length and improving performance. Check balls can be integrated in-line with the AM passage and the check ball pocket can be optimized for checking performance, thus facilitating reduced passage length and improved performance. In some cases, an AM printed check ball/valve and spring facilitates eliminating an assembly operation.

Figure 2:
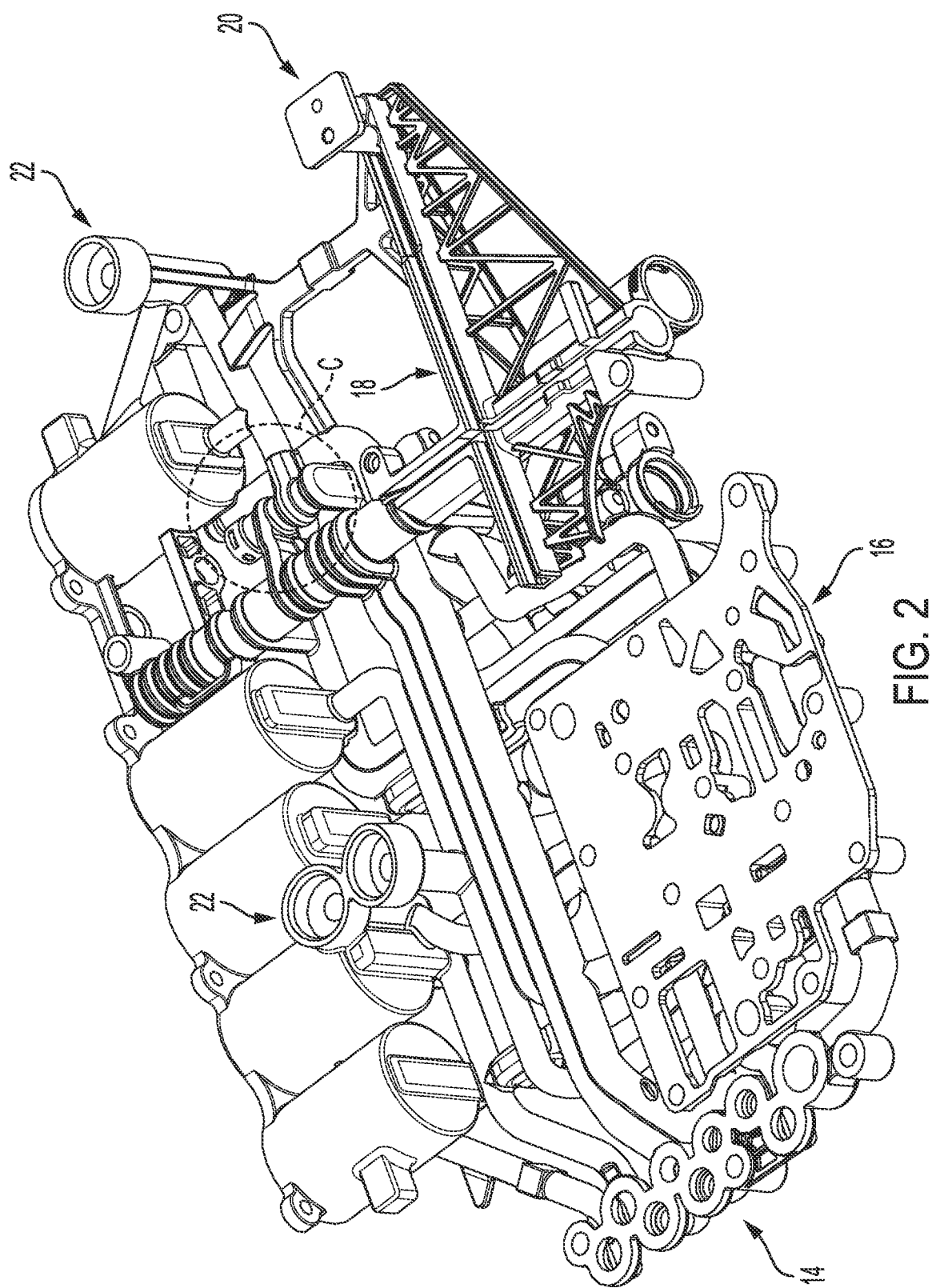
FIG. 2 is a top perspective view of the AM valve body shown in FIG. 1, in accordance with the principles of the present application.

Referring now to the drawings, FIGS. 1 and 2 illustrate an example hydraulic control unit 10 configured to be disposed within a transmission of a vehicle (not shown). The hydraulic control unit 10 generally includes a valve body 12 with a case interface 14, a solenoid module interface 16, a gear selector plate guide 18, a selector plate spring mounting location 20, and a plurality of clutch towers 22 configured to hold a seal to seal to the clutch housing. In the example embodiment, at least a portion of the valve body 12 is fabricated from an additive manufacturing (AM) process such as, for example, binder jetting, directed energy deposition, material jetting, material extrusion, sheet lamination, and vat polymerization. The additive manufacturing process enables hydraulic control unit 10 to have a valve body 12 formed with unique integrated features including hydraulic valve porting, routing, check balls, and orifices, as described herein in more detail. Further, although described in connection with a transmission hydraulic control unit, it will be appreciated that the AM features described herein may be utilized for other fluid or hydraulic control systems.

Figure 3:
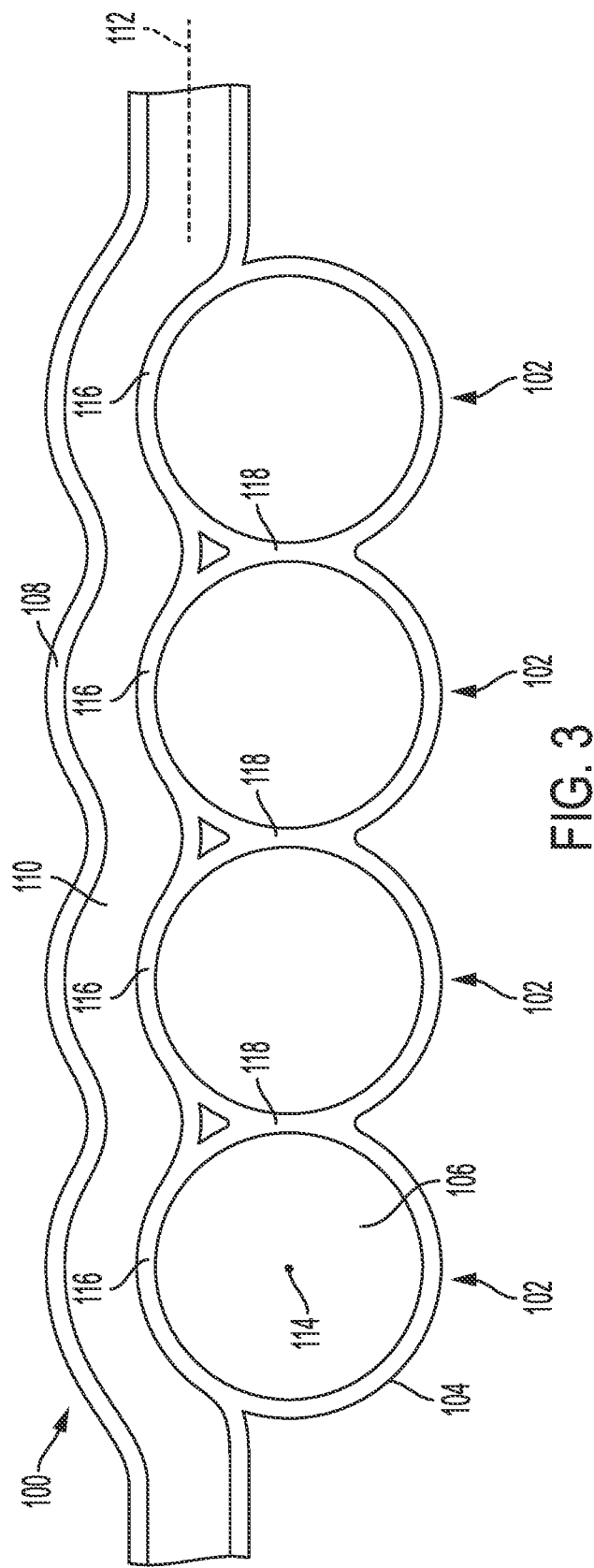
FIG. 3 is a cross-sectional view of an example integrated AM hydraulic passage and AM valve housing that may be formed in the AM valve body shown in FIG. 1, in accordance with the principles of the present application.

With reference to FIGS. 1 and 3, the valve body 12 includes a section 'A1' illustrating an AM hydraulic passage 100 integrated with a plurality of AM valve or accumulator housings 102 each having a tubular wall 104 defining a bore 106 configured to receive a hydraulic valve or accumulator (not shown). In the example embodiment, AM hydraulic passage 100 includes a tubular wall 108 defining a fluid passage 110 extending along a longitudinal axis 112 that is perpendicular to or substantially perpendicular to a longitudinal axis 114 of the AM bores 106. As illustrated, the AM hydraulic passage 100 and the AM valve housings 102 share a common wall 116, thereby reducing the material and mass of section 'A1' and thus the overall material and mass of the valve body 12. Similarly, adjacent AM valve/accumulator housings 102 share a common wall 118, which further reduces material and mass of the valve body 12. Additionally, the illustrated arrangement ties together the AM hydraulic passage 100 and the AM housings 102 to create a rigid structure, which provides increased support to the valve body 12 compared to separate conduits.

Figure 4:
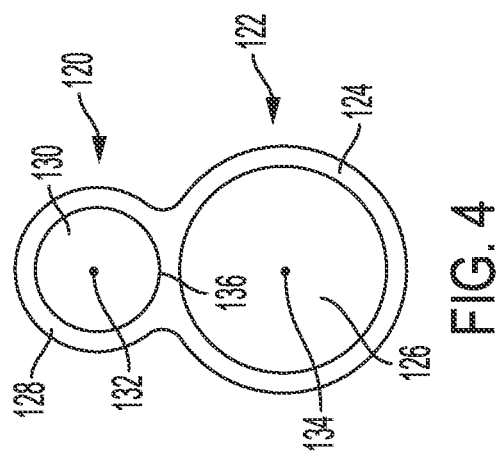
FIG. 4 is a cross-sectional view of another example integrated AM hydraulic passage and AM valve housing that may be formed in the AM valve body shown in FIG. 1, in accordance with the principles of the present application.

With reference to FIGS. 1 and 4, in a similar arrangement to FIG. 3, the valve body 12 includes a section 'A2' illustrating an AM hydraulic passage 120 integrated with an AM valve housing 122 having a tubular wall 124 defining a bore 126 configured to receive a hydraulic valve (not shown). In the example embodiment, AM hydraulic passage 120 includes a tubular wall 128 defining a fluid passage 130 extending along a longitudinal axis 132 that is parallel to or substantially parallel to a longitudinal axis 134 of the AM bore 126. As illustrated, the AM hydraulic passage 120 and the AM valve housings 122 share a common wall 136, thereby reducing the material and mass of section 'A2' and thus the overall material and mass of the valve body 12. AS such, the illustrated arrangement ties together the AM hydraulic passage 120 and the AM valve housings 122 to create a rigid structure, which provides increased support to the valve body 12 compared to separate conduits.

With reference now to FIG. 5, in some implementations, the valve body 12 can include an AM hydraulic control orifice assembly 140. In the example embodiment, the AM orifice assembly 140 is generally formed with a first AM hydraulic passage 142 and a second AM hydraulic passage 144, an orifice insert 146, and a plug 148. During the additive manufacturing process, the first AM hydraulic passage 142 and the second AM hydraulic passage 144 are formed as a single integrated component. The first AM hydraulic passage is formed with tubular wall 150 defining a fluid passage 152, and the second AM hydraulic passage 144 is formed with a tubular wall 154 defining a fluid passage 156. Additionally, the AM orifice assembly 140 is formed with an external opening 158 and a seat 160. The external opening 158 enables insertion of the orifice insert 146 into the first fluid passage 152 and into the seat 160 (e.g., press-in), as shown in FIG. 5. The orifice insert 146 includes an orifice 162 which is configured to regulate fluid flow and pressure between the first AM hydraulic passage 142 and the second AM hydraulic passage 144. Once the orifice insert 146 is seated within seat, the external opening 158 is capped with the plug 148 to fluidly seal the AM orifice assembly 140.

With reference now to FIGS. 1 and 6, the valve body 12 includes a section 'B1' illustrating an AM hydraulic control orifice assembly 170. In the example embodiment, the AM hydraulic control orifice assembly 170 is generally formed with a first AM hydraulic passage 172, a second AM hydraulic passage 174, an orifice 176, and a plug 178. During the additive manufacturing process, the first AM hydraulic passage 172 and the second AM hydraulic passage 174 are formed as a single integrated component. The first AM hydraulic passage 172 is formed with tubular wall 180 defining a fluid passage 182, and the second AM hydraulic passage 174 is formed with a tubular wall 184 defining a fluid passage 186. Additionally, the AM orifice assembly 170 is formed with an external opening 188 and a wall 190. The external opening 188 enables insertion of a machining tool (not shown) into the first fluid passage 182 to form (or merely finish) the orifice 176 in wall 190. Similarly, orifice 176 is configured to regulate fluid flow and pressure between the first AM hydraulic passage 172 and the second AM hydraulic passage 174. Once the orifice 176 is formed or machine finished, the external opening 188 is capped with the plug 178 to fluidly seal the AM orifice assembly 170.

Figure 7:
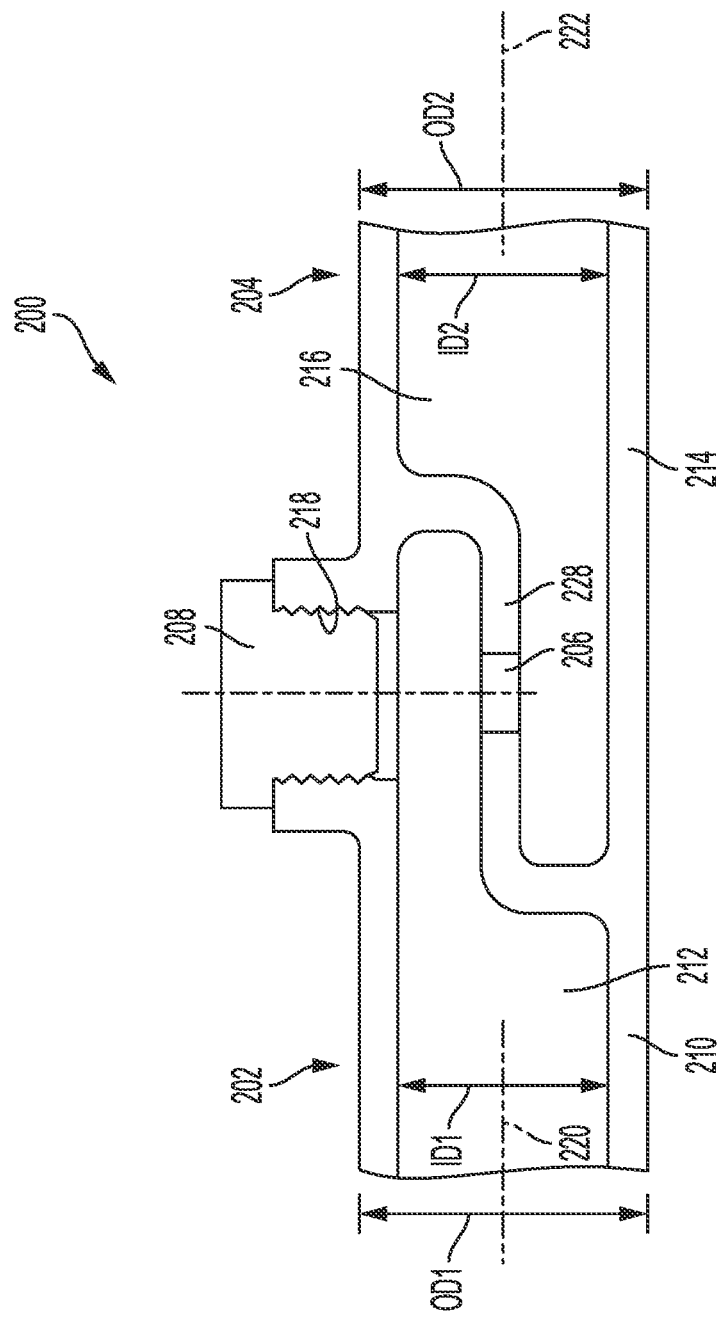
FIG. 7 is a cross-sectional view of another example AM hydraulic control orifice assembly that may be formed in the AM valve body shown in FIG. 1, in accordance with the principles of the present application.

With reference now to FIGS. 1 and 7, the valve body 12 includes a section 'B2' illustrating an AM hydraulic control orifice assembly 200, which advantageously enables the placement of a hydraulic control orifice between two hydraulic passages while maintaining the same outer tube diameter of both hydraulic passages. In the example embodiment, the AM hydraulic control orifice assembly 200 is generally formed with a first AM hydraulic passage 202, a second AM hydraulic passage 204, an orifice 206, and a plug 208. During the additive manufacturing process, the first AM hydraulic passage 202 and the second AM hydraulic passage 204 are formed as a single integrated component. The first AM hydraulic passage 202 is formed with tubular wall 210 having an outer diameter 'OD1' and an inner diameter 'ID1' defining a fluid passage 212 extending along a longitudinal axis 220. Similarly, the second AM hydraulic passage 204 is formed with a tubular wall 214 having an outer diameter 'OD2' and an inner diameter 'ID2' defining a fluid passage 216 extending along a longitudinal axis 222. In some implementations, the longitudinal axis 220, 222 are the same axis.

Additionally, the AM orifice assembly 200 is formed with an external opening 218 and a wall 228 such that a portion of the fluid passages 212, 216 overlap proximate the orifice 206. The external opening 218 enables insertion of a machining tool (not shown) into the first fluid passage 212 to form (or merely machine finish) the orifice 206 in wall 228. In this way, orifice 206 is configured to regulate fluid flow and pressure between the first AM hydraulic passage 202 and the second AM hydraulic passage 204 while the outer diameters 'OD1', 'OD2' and the inner diameters 'ID1', 'ID2' remain the same or substantially the same. Once the orifice 206 is formed or machine finished, the external opening 218 is capped with the plug 208 to fluidly seal the AM orifice assembly 200.

Figure 8:
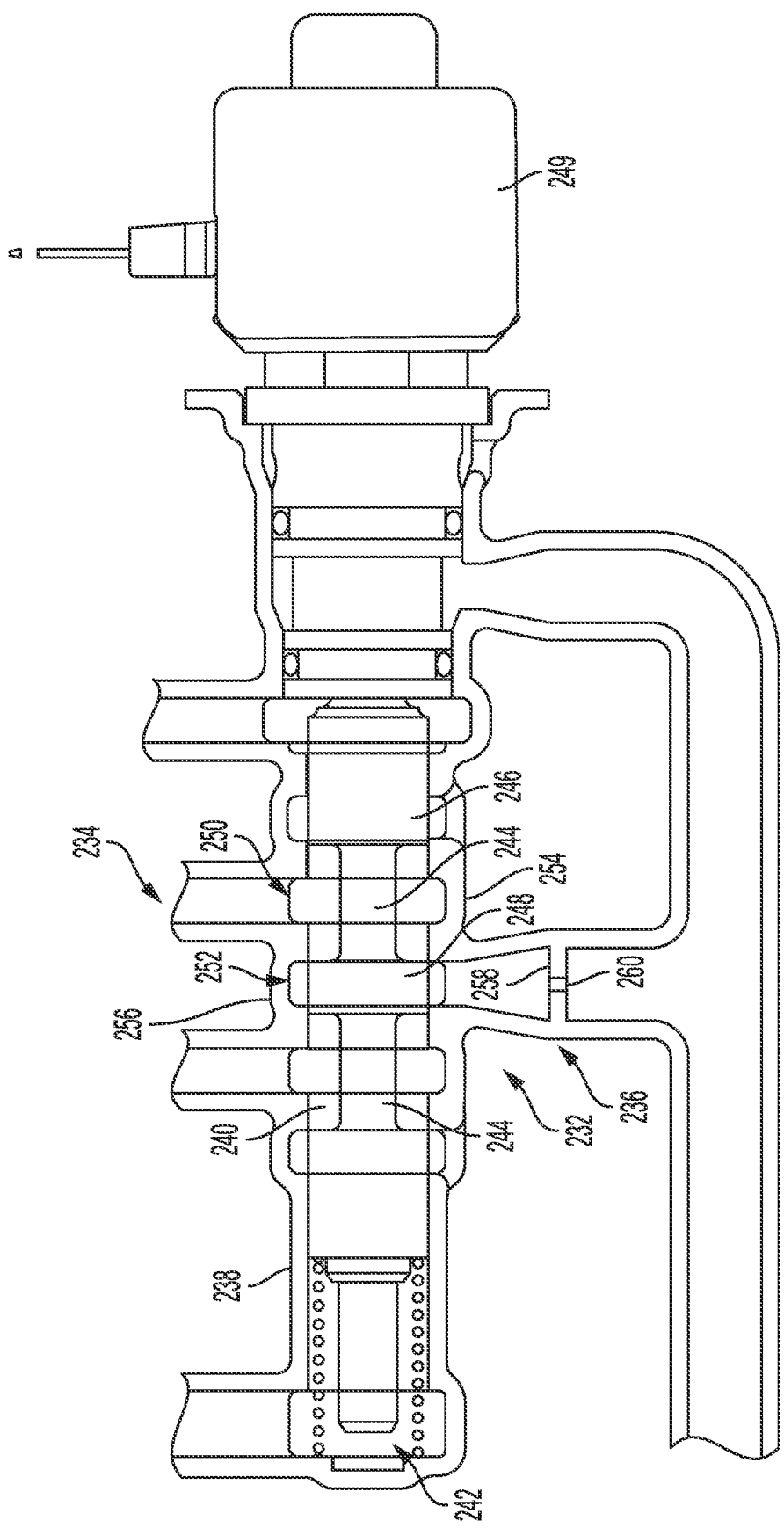
FIG. 8 is a cross-sectional view of an example AM valve port assembly that may be formed in the AM valve body shown in FIG. 1, in accordance with the principles of the present application.
Figure 9:
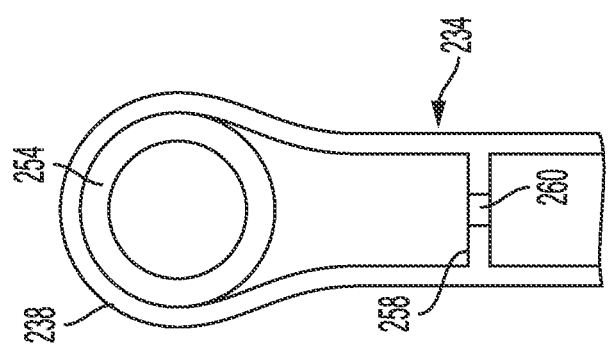
FIG. 9 is a cross-sectional view of the AM valve port assembly shown in FIG. 8 and taken along line 9-9, in accordance with the principles of the present application.
Figure 14:
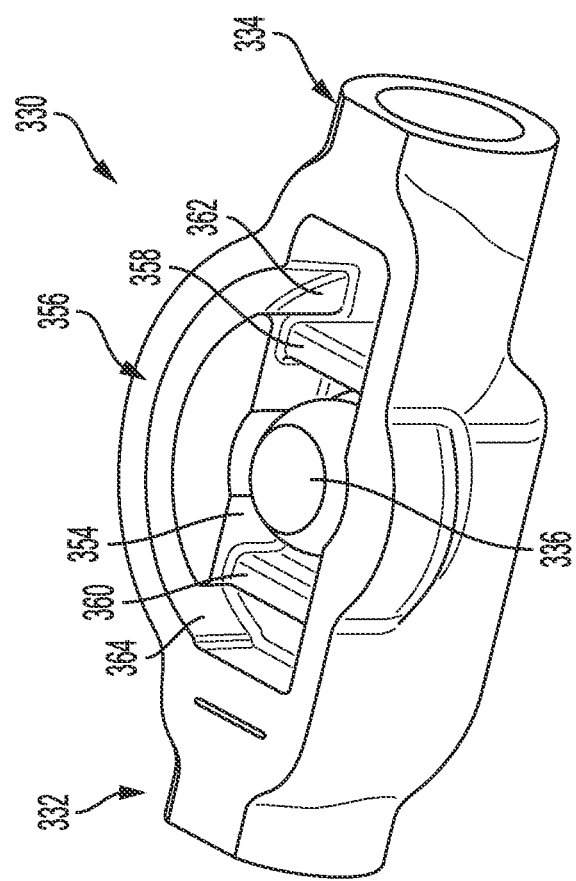
FIG. 14 is a perspective view of another example AM hydraulic control check ball assembly that may be formed in the AM valve body shown in FIG. 1, in accordance with the principles of the present application.

With reference now to FIGS. 2, 8, and 9, the valve body 12 includes a section 'C' illustrating an AM valve port assembly 230 that generally includes an AM valve port 232, a first AM hydraulic passage 234, and a second AM hydraulic passage 236 integrated into a single AM component. It will be appreciated that AM valve port assembly 230 may include additional valve porting and hydraulic passages (not shown).

In the example embodiment, the AM valve port 232 includes a tubular wall 238 forming a valve passage 240 configured to receive a valve assembly 242. The valve assembly 242 includes a valve stem 244 having a first seal 246 and a second seal 248. The valve stem 244 is selectively translatable by a solenoid assembly 249 within the valve passage 240 to selectively seal a first hydraulic port 250 defined at the intersection of the AM valve port 232 and the first AM hydraulic passage 234. Similarly, the valve stem 244 is selectively translatable within the valve passage 240 to selectively seal a second hydraulic port 252 defined at the intersection of the AM valve port 232 and the second AM hydraulic passage 236.

As illustrated in FIGS. 8 and 9, a first annulus 254 is formed in the AM valve port 232 at the first hydraulic port 250, and a second annulus 256 is formed in the AM valve port 232 at the second hydraulic port 252. In this way, the AM valve port 232 has a larger diameter at the annuli 254, 256 configured to enable even pressure distribution to enable gradual opening of the seals 246, 248 as they seal/unseal from their respective hydraulic port 250, 252. Additionally, during the additive manufacturing process, one or more hydraulic passages, such as first AM hydraulic passage 234, may be formed with an inner wall 258 having an orifice 260 configured to regulate fluid flow and pressure within the passage.

Figure 11:
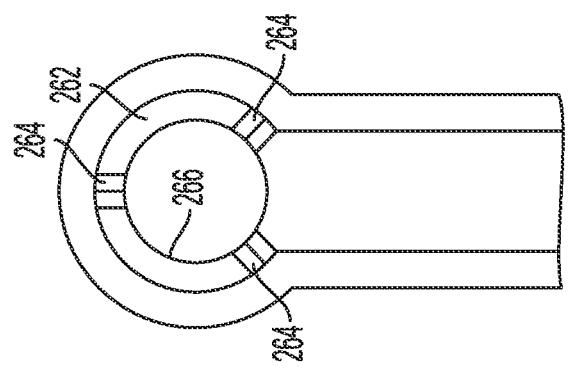
FIG. 11 is a cross-sectional view of another example AM valve port assembly with integrated notches, in accordance with the principles of the present application.
Figure 10:
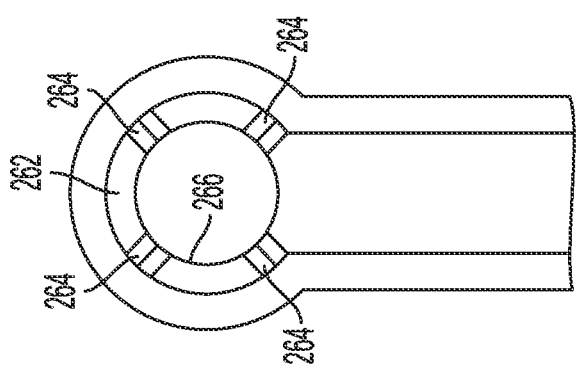
FIG. 10 is a cross-sectional view of an example AM valve port assembly with integrated notches, in accordance with the principles of the present application.

As shown in FIGS. 10 and 11, in some embodiments, the annulus 262 is formed with one or more notches 264 in an outer wall 266 at least partially defining the annulus 262. In the example embodiment, the notches 264 are configured to further enable even pressure distribution to enable the gradual opening of the seals 246, 248 as they seal/unseal from their respective hydraulic port 250, 252. FIG. 10 illustrates annulus 262 formed with four notches 264 evenly spaced or substantially event spaced about the circumference of the annulus. FIG. 11 illustrates annulus 262 formed with three notches 264 evenly spaced or substantially evenly spaced about the circumference of the annulus 262. It will be appreciated that the illustrated number of notches is merely exemplary and annulus 262 may have any suitable number of notches that enables AM valve port assembly 230 to function as described herein.

With reference now to FIG. 12, in some implementations, the valve body 12 can include an AM hydraulic control check ball assembly 270. In the example embodiment, the AM check ball assembly 270 is generally formed with a first AM hydraulic passage 272, a second AM hydraulic passage 274, a check ball 276, and a plug 278. During the additive manufacturing process, the first AM hydraulic passage 272 and the second AM hydraulic passage 274 are formed as a single integrated component. The first AM hydraulic passage 272 is formed with a tubular wall 280 defining a fluid passage 282, and the second AM hydraulic passage 274 is formed with a tubular wall 284 defining a fluid passage 286.

Additionally, the AM check ball assembly 270 is formed with an external opening 288 and a seat 290. The external opening 288 enables insertion of the check ball 276 into the first fluid passage 282 and into the seat 290, which includes a fluid passage 292 therethrough. Once the check ball 276 is inserted, the external opening 288 is capped with the plug 278 to fluidly seal the AM check ball assembly 270. The check ball 276 is configured to unseat from seat 290 to allow fluid flow in a first direction toward the second AM hydraulic passage 274, but facilitate preventing fluid flow in the opposite direction by seating the check ball 276 within seat 290 to block flow through fluid passage 292 should fluid flow from the second AM hydraulic passage 274 to the first AM hydraulic passage 272.

Additionally, as shown in FIG. 12, during the additive manufacturing process, first AM hydraulic passage 272 can be formed with a wall 294 with an integral orifice 296. Alternatively, or additionally, a machining tool can be inserted into the first fluid passage 282 to form (or merely machine finish) the orifice 296. As such, in addition to the check ball function, orifice 296 is configured to regulate fluid flow and pressure in the first AM hydraulic passage 272.

With reference now to FIG. 13, in some implementations, the valve body 12 can include an AM hydraulic check ball assembly 300, which advantageously enables the placement of a check ball between two hydraulic passages while maintaining the same fluid passage equivalent diameter of both hydraulic passages. In the example embodiment, the AM hydraulic check ball assembly 300 is generally formed with a first AM hydraulic passage 302, a second AM hydraulic passage 304, a check ball 306, and a plug 308. During the additive manufacturing process, the first AM hydraulic passage 302 and the second AM hydraulic passage 304 are formed as a single integrated component. The first AM hydraulic passage 302 is formed with a tubular wall 310 having an outer diameter 'OD3' and an inner diameter 'ID3' defining a fluid passage 312 extending along a longitudinal axis 324. Similarly, the second AM hydraulic passage 304 is formed with a tubular wall 314 having an outer diameter 'OD4' and an inner diameter 'ID4' defining a fluid passage 316 extending along a longitudinal axis 326. In some implementations, longitudinal axis 324, 326 are a common axis.

Additionally, the AM check ball assembly 300 is formed with an external opening 318 and a seat 320 such that a portion of the fluid passages 312, 316 overlap proximate a fluid passage 322 formed through the seat. The external opening 318 enables insertion of a machining tool (not shown) into the second fluid passage 314 to form (or merely machine finish) the fluid passage 322. In this way, check ball 306 is then inserted through external opening 318 and, along with seat 320, is configured to provide one-way flow between the first AM hydraulic passage 302 and the second AM hydraulic passage 304 while the outer diameters 'OD3', 'OD4' and the inner diameters 'ID3', 'ID4' remain the same or substantially the same. Once the check ball 306 is inserted and/or fluid passage 322 is formed or machine finished, the external opening 318 is capped with the plug 308 to fluidly seal the AM check ball assembly 300.

With reference now to FIGS. 1 and 14-16, the valve body 12 includes a section DI illustrating an AM hydraulic check ball assembly 330, which advantageously enables the placement of a check ball between two hydraulic passages while maintaining the same fluid passage diameter of both hydraulic passages. Further, the AM check ball assembly 330 includes a dual flow path to apply additional force to an opposite side of the check ball to facilitate quicker and more accurate seating.

In the example embodiment, the AM hydraulic check ball assembly 330 is generally formed with a first AM hydraulic passage 332, a second AM hydraulic passage 334, a check ball 336, and a plug 338. During the additive manufacturing process, the first AM hydraulic passage 332 and the second AM hydraulic passage 334 are formed as a single integrated component. The first AM hydraulic passage 332 is formed with a tubular wall 340 having an outer diameter 'OD5' and an inner diameter 'ID5' defining a fluid passage 342 extending along a longitudinal axis 366. Similarly, the second AM hydraulic passage 334 is formed with a tubular wall 344 having an outer diameter 'OD6' and an inner diameter 'ID6' defining a fluid passage 346 extending along a longitudinal axis 368. In some implementations, longitudinal axes 366, 368 are a common axis.

Additionally, the AM check ball assembly 330 is formed with an external opening 348 and a seat 350 such that a portion of the fluid passages 342, 346 overlap proximate a fluid passage 352 formed through the seat 350. The external opening 348 enables insertion of a machining tool (not shown) into the second fluid passage 346 to form (or merely machine finish) the fluid passage 352. In this way, check ball 336 is then inserted through external opening 348 and, along with seat 350, is configured to provide one-way flow between the first AM hydraulic passage 332 and the second AM hydraulic passage 334 while the outer diameters 'OD5', 'OD6' and the inner diameters 'ID5', 'ID6' remain the same or substantially the same. Once the check ball 336 is inserted and fluid passage 352 is formed or machine finished, the external opening 348 is capped with the plug 338 to fluidly seal the AM check ball assembly 330.

Figure 16:
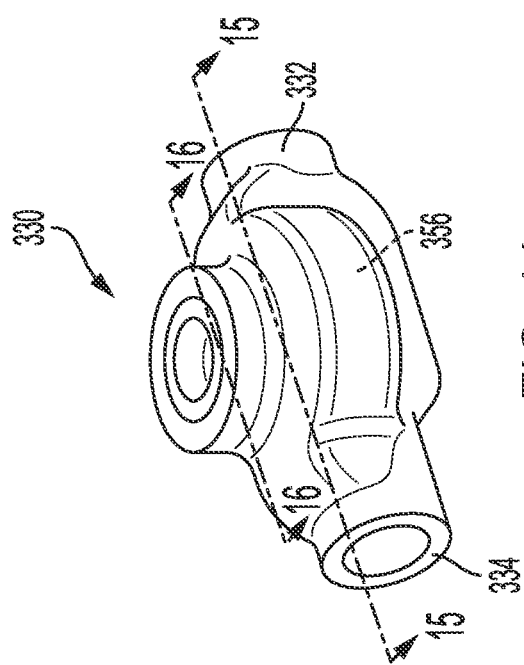
FIG. 16 is a cross-sectional view of the AM hydraulic control check ball assembly shown in FIG. 14 and taken along line 16-16, in accordance with the principles of the present application.
Figure 15:
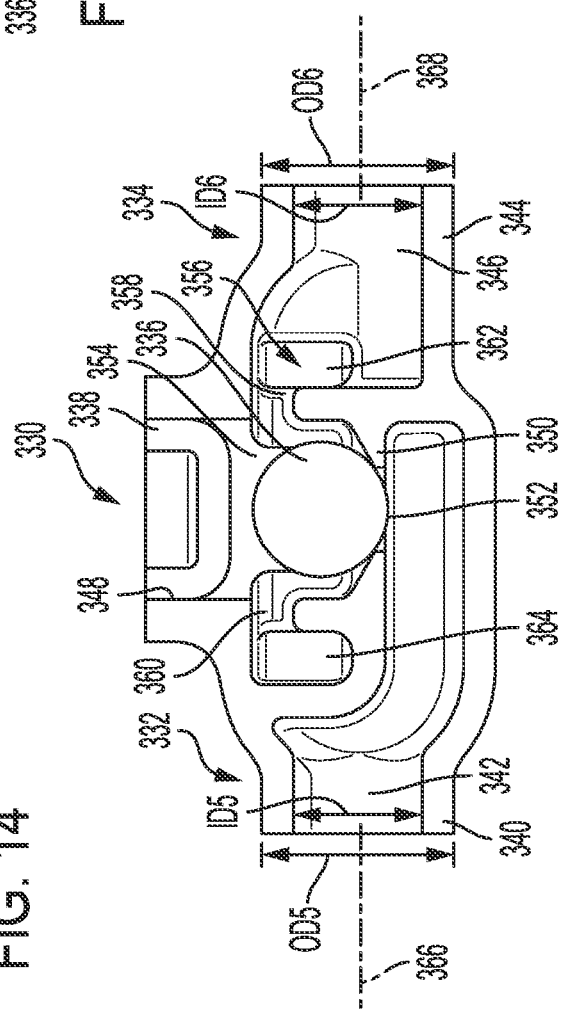
FIG. 15 is a cross-sectional view of the AM hydraulic control check ball assembly shown in FIG. 14 and taken along line 15-15, in accordance with the principles of the present application.

Additionally, as shown in FIGS. 15 and 16, during the additive manufacturing process, the AM check ball assembly 330 is formed with a chamber 354 and a check ball bypass passage 356 to thereby provide a dual path check ball arrangement that facilitates providing fluid forces on opposite sides of the check ball 336 during seating. In the example embodiment, chamber 354 includes a first inlet/outlet 358 and a second inlet/outlet 360, while the bypass passage 354 includes a third inlet/outlet 362 and a fourth inlet/outlet 364. If fluid tries to flow from the second AM hydraulic passage 334 to the first AM hydraulic passage 332, fluid would enter the first inlet/outlet 358 and engage check ball 336 for sealing against seat 350. However, since the fluid force could potentially force the check ball 336 against a side wall, the fluid also enters the third inlet/outlet 362, goes through bypass passage 356 to fourth inlet/outlet 364, and enters the chamber 354 via second inlet/outlet 360. Thus, fluid force acts on opposite sides of check ball 336 to facilitate proper seating.

Figure 17:
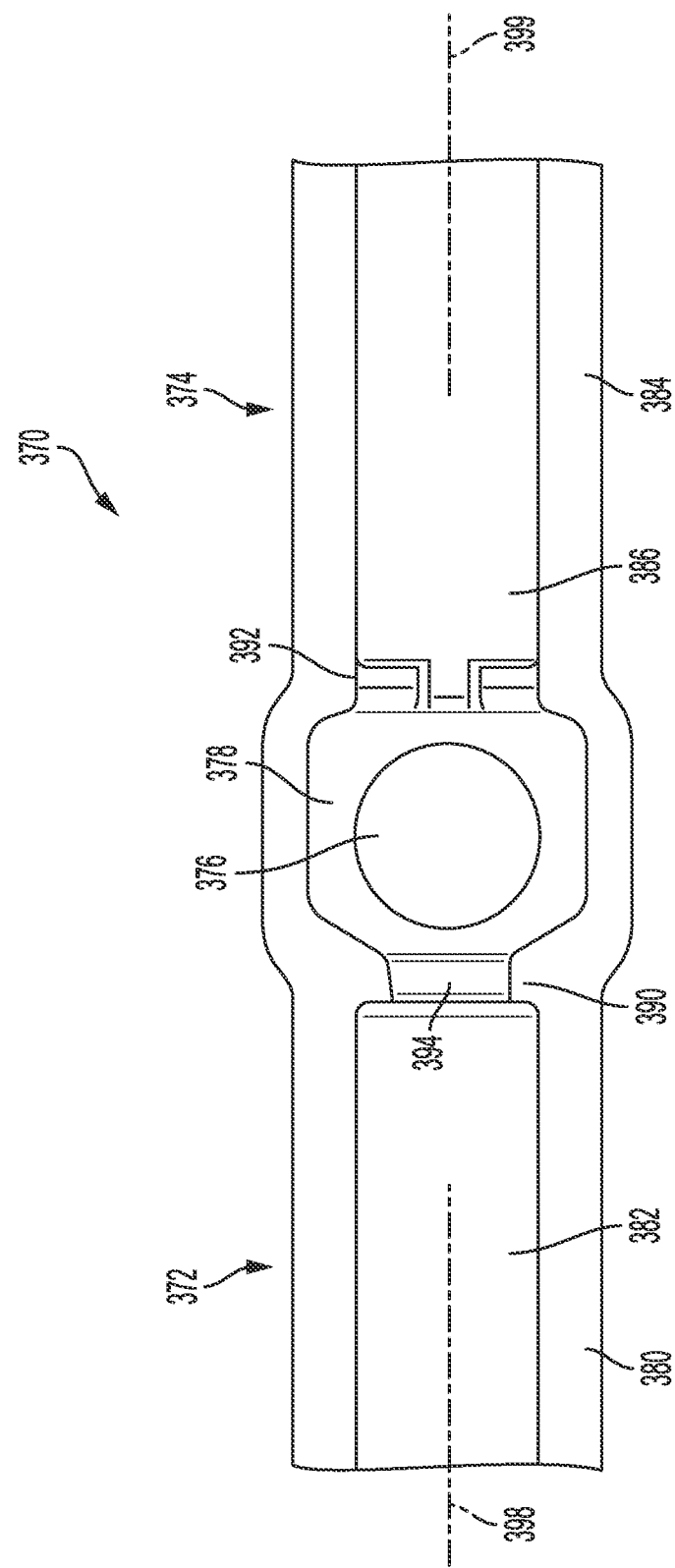
FIG. 17 is a cross-sectional view of another example AM hydraulic control check ball assembly that may be formed in the AM valve body shown in FIG. 1, in accordance with the principles of the present application.
Figure 18:
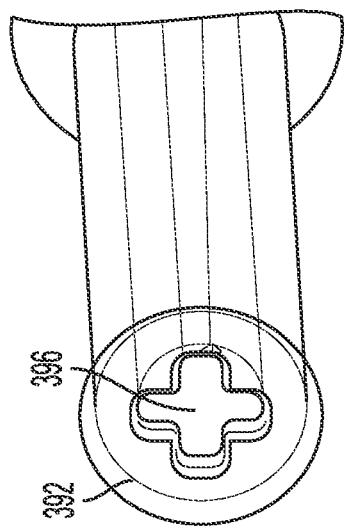
FIG. 18 is a sectional view of the AM hydraulic control check ball assembly shown in FIG. 17 without a check ball, in accordance with the principles of the present application.
Figure 19:
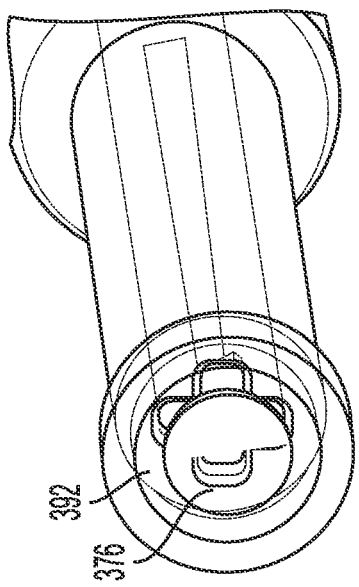
FIG. 19 is a sectional view of the AM hydraulic control check ball assembly shown in FIG. 18 with an unseated check ball, in accordance with the principles of the present application.

With reference now to FIGS. 17-19, in some implementations, the valve body 12 can include an AM hydraulic control check ball assembly 370. In the example embodiment, the AM check ball assembly 370 is generally formed with a first AM hydraulic passage 372, a second AM hydraulic passage 374, and a check ball 376. During the additive manufacturing process, the first AM hydraulic passage 372 and the second AM hydraulic passage 374 are formed as a single integrated component with the check ball 376 formed in a ball chamber 378, or alternatively pausing the AM process during chamber formation and placing the check ball 376 therein, and subsequently completing the process. The first AM hydraulic passage 372 is formed with a tubular wall 380 defining a fluid passage 382 extending along a longitudinal axis 398, and the second AM hydraulic passage 374 is formed with a tubular wall 384 defining a fluid passage 386 extending along a longitudinal axis 399. In some implementations, longitudinal axes 398, 399 are a common axis.

In the example embodiment, the AM check ball assembly 370 is formed with the ball chamber 378 between a seat 390 and a non-checking ball stop 392. The seat 390 is formed with a fluid passage 394 therethrough and provides a surface for the check ball 376 to seal against to prevent flow from right to left (as shown in FIG. 17). FIGS. 18 and 19 illustrate the non-checking ball stop 392. In the example embodiment, the ball stop 392 has a generally cross shape port 396 (FIG. 18) that retains the check ball 376 within the ball chamber 378, but allows fluid to flow around the ball and through the port 396 when fluid flows from left to right (as shown in FIG. 17).

Figure 20:
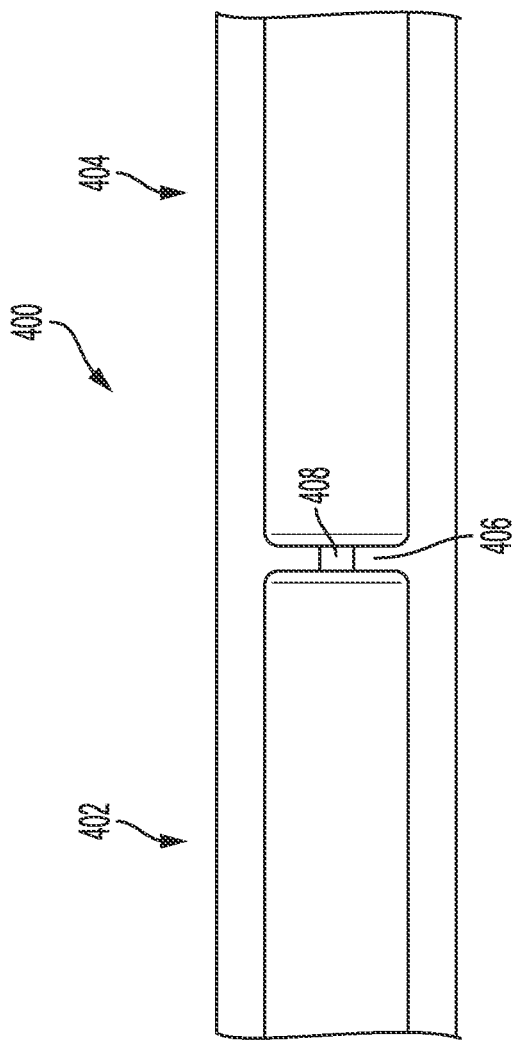
FIG. 20 is a cross-sectional view of an example AM hydraulic control orifice assembly that may be formed in the AM valve body shown in FIG. 1, in accordance with the principles of the present application.

With reference now to FIG. 20, in some implementations, the valve body 12 can include an AM hydraulic control orifice assembly 400, which advantageously enables the placement of a hydraulic control orifice between two hydraulic passages while maintaining the same fluid passage diameter of both hydraulic passages. During the additive manufacturing process, a first AM hydraulic passage 402 and a second AM hydraulic passage 404 are formed as a single integrated component with an internal wall 406 having an integral orifice 408 formed without machining. As such, orifice 408 is configured to regulate fluid flow and pressure between the first AM hydraulic passage 402 and the second AM hydraulic passage 404.

Described herein are systems and methods for an additive manufactured hydraulic valve body. Various features are formed in the additive manufactured valve body that otherwise could not be formed using conventional casting processes. The features include additive manufactured hydraulic passages, hydraulic control orifices, hydraulic control valves, and check valves integrated into the overall additive manufactured valve body. In this way, typically separate components are integrated into a single component, which drastically reduces the number of required fasteners and overall mass of the system. Advantageously, hydraulic passages can be shortened, routed directly, and reduced in size, leakage is reduced or eliminated, and orifices and check valves can be integrated directly into hydraulic passages.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An additive manufactured (AM) hydraulic control assembly for a vehicle transmission, comprising:
a first AM hydraulic passage having a first tubular wall defining a first fluid passage;
a second AM hydraulic passage integrally formed with the first AM hydraulic passage and having a second tubular wall defining a second fluid passage;
an AM wall integrally formed with the first and second AM hydraulic passages and fluidly separating the first and second fluid passages;
a ball seat integrally formed in the AM wall and a check ball disposed in one of the first and second fluid passages and configured to selectively seal against the ball seat to facilitate preventing fluid flow therethrough;
a chamber fluidly coupled between the first and second fluid passages and configured to receive the check ball; and
a bypass passage fluidly coupled to the chamber to provide a dual path check ball arrangement that facilitates providing fluid forces on opposite sides of the check ball during seating.

2. The AM hydraulic control assembly of claim 1, wherein the first AM hydraulic passage extends along a first axis and the second AM hydraulic passage extends along a second axis.

3. The AM hydraulic control assembly of claim 2, wherein the first axis and the second axis are the same axis.

4. The AM hydraulic control assembly of claim 2, wherein the hydraulic control orifice extends along a third axis.

5. The AM hydraulic control assembly of claim 4, wherein the third axis is substantially perpendicular to the first and second axes.

6. The AM hydraulic control assembly of claim 1, wherein the first AM hydraulic passage is formed with an external opening configured to enable access to the hydraulic control orifice, and including a plug configured to selectively seal the hydraulic control orifice.

7. The AM hydraulic control assembly of claim 1, wherein a portion of the first fluid passage and a portion of the second fluid passage overlap where the AM wall separates the first and second fluid passages.

8. An additive manufactured (AM) valve body for a hydraulic control unit of a vehicle transmission, the AM valve body comprising:
an AM hydraulic control assembly including:
a first AM hydraulic passage having a first tubular wall defining a first fluid passage;
a second AM hydraulic passage integrally formed with the first AM hydraulic passage and having a second tubular wall defining a second fluid passage;
an AM wall integrally formed with the first and second AM hydraulic passages and fluidly separating the first and second fluid passages; and
at least one of (i) a hydraulic control orifice formed in the wall and configured to regulate fluid flow and pressure between the first and second fluid passages, and (ii) a ball seat formed in the wall and a check ball disposed in one of the first and second fluid passages and configured to selectively seal against the ball seat to facilitate preventing fluid flow therethrough;
a third AM hydraulic passage having a third tubular wall defining a third fluid passage; and
at least one AM valve housing having a fourth tubular wall defining a bore configured to receive a hydraulic valve,
wherein the third AM hydraulic passage and the at least one AM valve housing are integrally formed and share a common wall.

9. An additive manufactured (AM) valve body for a hydraulic control unit of a vehicle transmission, the AM valve body comprising:
an AM hydraulic control assembly including:
a first AM hydraulic passage having a first tubular wall defining a first fluid passage;

a second AM hydraulic passage integrally formed with the first AM hydraulic passage and having a second tubular wall defining a second fluid passage;

an AM wall integrally formed with the first and second AM hydraulic passages and fluidly separating the first and second fluid passages; and at least one of (i) a hydraulic control orifice formed in the wall and configured to regulate fluid flow and pressure between the first and second fluid passages, and (ii) a ball seat formed in the wall and a check ball disposed in one of the first and second fluid passages and configured to selectively seal against the ball seat to facilitate preventing fluid flow therethrough; and an AM valve port assembly comprising:

a plurality of AM hydraulic passages; and an AM valve port integrally formed with and fluidly coupled to the plurality of AM hydraulic passages, the AM valve port configured to receive a valve stem with a plurality of seals configured to selectively hydraulically seal one or more hydraulic passages of the plurality of AM hydraulic passages.

10. The AM valve body of claim 9, where the AM valve port includes an outer wall forming with an annulus about an intersection of the AM valve port and one hydraulic passage of the plurality of hydraulic passages, and wherein at least one notch is formed in the outer wall to facilitate even pressure distribution to enable the gradual opening of the plurality of seals as they seal/unseal from their respective hydraulic passage.

* * * * *